United States Patent [19]

Gaylord

[11] 4,374,814

[45] Feb. 22, 1983

[54] METHOD FOR REMOVAL OF GASEOUS FORMALDEHYDE FROM THE ATMOSPHERE

[75] Inventor: Norman G. Gaylord, New Providence, N.J.

[73] Assignee: Pure Air, Inc., Metairie, La.

[21] Appl. No.: 258,499

[22] Filed: Apr. 28, 1981

[51] Int. Cl.$^3$ ............................................ B01D 53/34
[52] U.S. Cl. ..................................... 423/245; 55/68; 55/74; 422/36; 568/493
[58] Field of Search ..................... 423/210, 245; 55/68, 55/74; 422/36; 568/448, 493

[56] References Cited

U.S. PATENT DOCUMENTS 2,049,608  8/1936  Forrester ........................ 423/245 X
3,898,038  8/1975  Anderson ....................... 423/245 X

OTHER PUBLICATIONS

Blanksma, "The Absorption of Formaldehyde by Starch", and The Absorption of Formaldehyde by Cellulose, Chemical Abstracts, vol. 23, No. 7, Apr. 10, 1929, p. 2700.

*Primary Examiner*—Earl C. Thomas
*Attorney, Agent, or Firm*—Lawrence Rosen

[57] ABSTRACT

A method for purifying air by removing gaseous formaldehyde under ambient conditions, by bringing the air in contact with a solid shaped composition consisting essentially of one or more polyhydric water-soluble polymers and ambient moisture, in the absence and in the presence of a solid substrate.

26 Claims, No Drawings

METHOD FOR REMOVAL OF GASEOUS FORMALDEHYDE FROM THE ATMOSPHERE

BACKGROUND OF THE INVENTION

1. Field of the Invention

This invention relates to a method for purifying air by removing gaseous formaldehyde which is present as an undesirable pollutant or contamination therein.

2. Description of the Prior Art

Formaldehyde-based products are widely used in the fields of coatings, binders and adhesives. Decorative laminates, plywood, particle board, textile finishes, paper coatings, bonded nonwoven cellulosic webs including wet-strength paper and disposable diapers, brake linings and foam insulation are among the numerous products which utilize crosslinkable resins prepared by the reaction of formaldehyde with either phenols, urea or melamine, including low molecular weight linear and cyclic analogs and prepolymers thereof.

In some cases, free formaldehyde is retained in fully cured composites, laminates and coatings. Further, gaseous formaldehyde may be released slowly from cured compositions at room temperature or at slightly elevated temperatures in the presence of water or under high humidity conditions.

Since formaldehyde is volatile and remains a gas under ambient temperature and pressure, it escapes into the air during the manufacture of the resins and the products prepared therefrom. The release of gaseous formaldehyde may also occur when the finished product, e.g. plywood, wall panelling, floorboard, foam insulation, durable press fabric, etc., is in place or in use.

Exposure to gaseous formaldehyde may result in respiratory difficulties, eye and skin irritation, headaches, vomiting and severe irritation to the mucous membranes. There is also a possibility that formaldehyde is a carcinogen.

The removal of gaseous formaldehyde from the air in facilities manufacturing or using formaldehyde-based resins has been a matter of concern for some time. The National Institute for Occupational Safety and Health (NIOSH) Method P&CAM 125, issued in 1973, describes a method for the analysis of "Formaldehyde in Air." In more recent years, the U.S. Consumer Product Safety Commission has become concerned about formaldehyde evolution from urea-formaldehyde foam in insulated buildings and from plywood and particle board in mobile homes.

In order to minimize or decrease the exposure to gaseous formaldehyde, various methods have been used to remove the formaldehyde from the air. Thus, the air has been passed through scrubbing towers or filters containing liquid absorbents, e.g. water or an aqueous solution or ammonium bicarbonate, or solid absorbents, e.g. activated carbon, resulting in absorption of the gaseous formaldehyde in the atmosphere. Oxidation of the formaldehyde has been promoted by passing the air through or over alkaline earth metal peroxides or alumina or clay pellets impregnated with potassium permanganate.

Although water and liquid absorbents in scrubbing towers may be effective in manufacturing facilities where large volumes of air are recirculated, they are expensive and impractical for use in dwellings. Solid absorbents such as activated carbon are effective at normal temperatures but lose their efficiency when the temperature rises. In hot, humid climates, during the summer, when the formaldehyde vapors are particularly irritating and troublesome, the absorbing capacity of the activated carbon is not only reduced, but formaldehyde which was absorbed when the temperature and humidity were lower, e.g. during the cooler evening and night hours, is desorbed and liberated into the air during the heat and humidity of the day.

While oxidizing agents such as metal peroxides and potassium permanganate are effective in converting formaldehyde into formic acid, they are non-selective and rapidly lose their reactivity by indiscriminate oxidation of other contaminants and pollutants which have reducing characteristics, such as mercaptans, hydrogen sulfide and carbon monoxide.

SUMMARY OF THE INVENTION

According to this invention, there is provided a method for removing gaseous formaldehyde from the atmosphere under ambient conditions.

It has now been found that gaseous formaldehyde may be removed from the atmosphere under ambient conditions by permitting or causing the air to come into contact with a solid shaped composition consisting essentially of one or more polyhydric water-soluble polymers and ambient moisture.

The term "consisting essentially of" means that in addition to one or more polyhydric polymers and ambient moisture, other components can be present in the solid shaped composition provided that the basic and essential characteristics of the solid shaped composition are not materially affected thereby.

It has further been found that gaseous formaldehyde may be removed from the atmosphere under ambient conditions by coming into contact with solid shaped compositions prepared by coating a solid substrate or impregnating a porous or fibrous solid substrate with a composition consisting essentially of one or more polyhydric water-soluble polymers and water.

It has also been found that gaseous formaldehyde may be removed from the atmosphere under ambient conditions by causing the air to come into contact with a mixture of a solid shaped composition consisting essentially of one or more polyhydric water-soluble polymers and ambient moisture and a solid absorbent which is capable of absorbing gaseous formaldehyde from the air.

Compositions containing formaldehyde and various polyhydric water-soluble polymers are well known. Thus, formaldehyde is recommended as a preservation for aqueous solutions of hydroxyethylcellulose, hydroxypropylcellulose and other cellulose derivatives. Poly(vinyl formal) is prepared by the interaction of formaldehyde with poly(vinyl alcohol). The reaction generally requires the use of dilute aqueous solutions of the water-soluble polymer and/or dilute solvents of formaldehyde. Formalization may also be carried out by the reaction of poly(vinyl alcohol) film or fiber with a dilute solution of formaldehyde. In either case, the reaction is generally conducted in the presence of an acid catalyst at elevated temperatures (Encyclopedia of Polymer Science and Technology, Vol. 14, pp. 208–217, Interscience Publishers, 1971).

The compositions of the prior art are prepared by the use of dilute solutions of formaldehyde in conjunction with the water-soluble polymers in either dilute solution or solid form. It is therefore surprising to find that the solid shaped compositions consisting essentially of the polyhydric water-soluble polymers and only ambient moisture can interact with gaseous formaldehyde under ambient conditions rapidly enough that such compositions may be used in a method to remove gaseous formaldehyde from the atmosphere.

DETAILED DESCRIPTION OF THE INVENTION

In order to remove gaseous formaldehyde from the air in accordance with the method of this invention, the contaminated air is brought into contact with solid shaped compositions consisting essentially of one or more polyhydric water-soluble polymers and ambient moisture.

The term polyhydric water-soluble polymers includes polysaccharides, modified polysaccharides and synthetic addition and condensation polymers and derivatives thereof containing a high concentration of hydroxyl groups.

Representative polysaccharides which are useful in the method of this invention include starch, starch ethers and other derivatives such as methylstarch, carboxymethylstarch and hydroxyalkylstarch. Hydroxyethyl and hydroxypropylstarch which have a relatively high concentration of unsubstituted hydroxyl groups are particularly useful.

Cellulose ethers such as alkylcellulose, e.g. methylcellulose and ethylcellulose, carboxyalkylcellulose and hydroxyalkylcelluloses are useful in the method of this invention. Hydroxyalkylcelluloses which have a relatively high concentration of unsubstituted hydroxyl groups are particularly useful. Thus, hydroxyethylcellulose, hydroxypropylcellulose, hydroxyethylmethylcellulose, hydroxypropylmethylcellulose, hydroxyethylethylcellulose, sodium carboxymethyldroxyethylcellulose and dihydroxypropylcellulose may be used in the method of this invention.

Partially crosslinked starch and cellulose derivatives, which retain considerable water swellability although not water-soluble, are useful in the solid compositions which are effective in the method of this invention. Thus, derivatives which have been partially crosslinked by reactions with reactants such as glyoxal, dimethylolurea, water-soluble urea- or melamine-formaldehyde resins, citric acid, epichlorohydrin and other reagents which are well known to those skilled in the art may be used. Similarly, carboxymethylcellulose which has been lightly crosslinked by acidification followed by heating, and is readily swollen but insoluble in water, may be used in the method of this invention.

Other substituents may be present on the cellulose and starch derivatives, provided the materials retain water solubility or water swellability and contain a high concentration of unsubstituted hydroxyl groups for reaction with formaldehyde. Thus, oxidized cellulose and starch containing carboxyl groups, cyanoethylstarch, carbamoylethylstarch and sulfoalkylstarch ethers as well as starch and cellulose esters with a low degree of substitution and a high concentration of hydroxyl groups are also useful.

In addition to the derivatives of cellulose and starch prepared by reaction with the hydroxyl groups, graft copolymers of the polysaccharides and their derivatives, prepared by copolymerization with vinyl monomers such as acrylic esters, acrylonitrile, acrylamide, vinyl acetate, styrene and the like, may be used in the method of the invention provided they retain a high concentration of hydroxyl groups. Hydrolysis products of the graft copolymers, e.g. cellulose or starch-acrylic acid graft copolymers prepared by hydrolysis of acrylonitrile or acrylic ester graft copolymers, are also useful in the method of this invention provided they contain a high concentration of hydroxyl groups.

Naturally occurring polysaccharides such as hemicelluloses including xylans, mannans, galactans, glucomannans, galactoglucomannans, arabinogalactans and polytran and their derivatives, seaweed polysaccharides including algin, carrageenan, fucoidan, laminaran and agar and their derivatives, plant exudate and seed polysaccharides including gum arabic, gum ghatti, gum karaya, tamarind gum, tragacanth gum, guar gum, locust bean gum and pectin and their derivatives, and microbial polysaccharides including xanthan gum and dextran, contain a high concentration of hydroxyl groups capable of reacting with formaldehyde and are useful in the method of this invention. Graft copolymers of these naturally occurring polysaccharides and their derivatives are also useful. Mixtures of polysaccharides, as well as their derivatives and graft copolymers may also be used in the method of this invention.

Synthetic addition and condensation polymers containing a high concentration of hydroxyl groups may be used in the method of this invention. Thus, poly(vinyl alcohol), partially hydrolyzed poly(vinyl acetate), poly(hydroxyethyl acrylate), poly(hydroxyethyl methacrylate), poly(dihydroxypropyl acrylate) as well as copolymers of the hydroxyalkyl acrylic and methacrylic esters and hydrolyzed copolymers of vinyl acetate, glycidyl acrylate and glycidyl methacrylate may be used in the method of this invention. Hydroxyalkylation of the hydroxyl-containing vinyl polymers, including hydroxyethylated poly(vinyl alcohol), as well as of carboxyl-containing vinyl polymers, yields hydroxyl-containing polymers which are useful in the method of this invention.

Phenol-formaldehyde, urea-formaldehyde and epoxy resins and other hydroxyl-containing condensation polymers, derivatized by oxyalkylation and other reactions to increase the concentration of hydroxyl groups and to promote water-solubility and/or water-swellability, are useful in the method of this invention.

Graft copolymers of the hydroxyl-containing addition and condensation polymers, as well as partially crosslinked polymers, may be used in this invention.

In contrast to solid absorbents such as activated carbon, which absorb formaldehyde without reaction, it is believed that the effective removal of gaseous formaldehyde from the air by contact with the polyhydric polymers which are used in the solid shaped compositions of the method of this invention, results from a chemical reaction between the hydroxyl groups of the polymer and formaldehyde, i.e. hemiformal or formal formation. The presence of ambient moisture permits penetration of the gaseous formaldehyde into the solid polyhydric polymer composition.

Low molecular weight polyols, including glycerol, sorbitol, ethylene glycol, diethylene glycol, polyalkylene glycols and alkanolamines, as well as other water-soluble compounds known to serve as plasticizers and humectants to the polyhydric polymers used in the method of this invention, may be present in the solid shaped compositions to serve as co-reactants as well as plasticizers and humectants, since they react with gaseous formaldehyde.

The presence of an acidic or basic catalyst promotes the reaction between the hydroxyl groups of the polyhydric polymer and formaldehyde. Suitable acid catalysts include inorganic acids such as hydrochloric acid, phosphoric acid and sulfuric acid, organic carboxylic acids including acetic acid, propionic acid and paratoluenesulfonic acid, and partial acid esters such as butyl phosphoric acid. Suitable basic catalysts include alkali metal hydroxides, ammonium hydroxides, quaternary ammonium hydroxides and amines. The catalyst concentration is generally less than 1% by weight of the polyhydric polymer. In the case of carboxyl-containing polymers and the natural polysaccharides and their derivatives which may contain carboxyl groups as a result of hydrolysis and/or oxidation, the presence of an acid catalyst is optional.

The compositions which are useful in the method of this invention, may be modified by one or more conventional additives such as stabilizers and inhibitors of oxidative and ultraviolet degradation and preservatives against biological attack. The latter include phenol, sodium benzoate, sodium propionate, sorbic acid and its potassium, sodium and calcium salts, phenylmercuric acetate and nitrate, benzyl bromoacetate, methyl paraben-propyl paraben combinations and other preservatives well known to those skilled in the art.

Colorants including dyes and pigments as well as fillers and reinforcing agents may also be present in the solid shaped compositions which are useful in the method of this invention.

The solid shaped compositions which are used in this invention may be prepared by dissolving a water-soluble polyhydric polymer in water. The humectant, plasticizer, catalyst, preservative and colorant, when used, may be added during or after the preparation of the solution.

The solution may be poured into a container to form a layer of the desired thickness and then either allowed to dry at room temperature or at an elevated temperature. The resultant gel may be used per se or cut into strips, cubes or any desired shape.

The solution may be mixed with a particulate solid such as perlite, sand, sawdust, wood chips, vermiculite, marble chips, chopped polymer foam such as polystyrene, polyethylene, polyester, polyurethane or phenolic foam, chopped polymer film and the like, and dried at room or at an elevated temperature while mixing to yield solid particles or chips coated with the solid polyhydric polymer and the other components of the solution. The water content of the coated shaped solid is a function of the humectant content, if any, and the equilibrium moisture content of the polyhydric polymer under ambient temperature and humidity.

Fibrous solids such as cotten, glass wool, rock wool, chopped polyolefin, nylon, polyester, rayon and other fibers, etc. may be dipped into or sprayed with the polyhydric polymer solution and dried.

The polyhydric polymer solution may be sprayed or spread onto a nonwoven web such as paper or polyolefin, polyester, nylon, rayon or glass fiber web, a woven cloth or fabric or screening material such as cheesecloth, mosquito netting, metal or polymeric screening, etc. and dried.

The solid compositions used in the method of this invention may be in the form of sheet or fibrous material, e.g. poly(vinyl alcohol) paper and hydroxypropylcellulose fibers. The fibers may be used in the preparation of a woven or nonwoven web. The sheet or fibrous material may be prepared from solutions containing plasticizer, catalyst, preservative, etc., or the preformed sheet or fibrous mat may be sprayed or dipped into an aqueous solution containing these components of the solid shaped composition of the method of this invention.

The unsupported gel, the coated solids or the sheet or fibrous compositions may be partially crosslinked by incorporating a crosslinking agent such as glyoxal, citric acid, etc., as previously disclosed, into the polyhydric polymer solution before conversion into a shaped object. Crosslinking occurs during the drying of the shaped polyhydric polymer composition. Alternatively, the solid shaped composition may be immersed in a solution containing the crosslinking agent and then dried to promote interaction with the polyhydric polymer.

Due to the nature of polyhydric polymers, the dried solid shaped composition will absorb moisture from the atmosphere to reach an equilibrium moisture content that varies with the ambient humidity of the atmosphere.

In order to remove gaseous formaldehyde from the atmosphere, in accordance with the method of this invention, the solid shaped polyhydric polymer composition may be placed in an appropriate container consistent with its shape and placed in the area to be freed of formaldehyde vapors. Thus, the shaped gel or coated particulate solid may be placed in a permeable bag or container through which the contaminated air can pass and contact the shaped polyhydric polymer composition. The bag or container, e.g. a perforated closed cup-like container, may be hung on a wall, placed on a shelf or suspended in front or behind the return vent in a heating or air conditioning system.

Coated fibers, nonwoven webs or screening may be used in a filter in a heating or air conditioning system. A filter may be prepared using fibers of the polyhydric polymer composition.

Shaped polyhydric polymer compositions may be placed in a portable or stationary device or system through which air is recirculated to remove any formaldehyde present therein.

Other methods or devices utilizing the shaped polyhydric polymer compositions disclosed herein for the removal of gaseous formaldehyde from the atmosphere will be obvious to those skilled in the art.

The solid polyhydric polymer compositions described herein may be used alone or in admixture with solid absorbents. The use of the mixture may provide certain advantages. Thus, activated carbon absorbs formaldehyde from the air in an amount which depends upon the temperature and decreases with increasing temperature. The solid shaped compositions based upon polyhydric polymers, used in the method of this invention, undergo a chemical reaction with formaldehyde, presumably formal or hemiformal formation, as well as absorption, and the extent of reaction increases with increasing temperature.

A mixture of activated carbon particles or pellets and solid cubes containing a polyhydric polymer such as hydroxyethylcellulose and glycerol and ambient moisture will remove formaldehyde from the air at room temperature, i.e. about 25° C., as well as at an elevated temperature, e.g. 50° C. The activated carbon will absorb less formaldehyde at 50° C. than at 25° C., while the polyhydric polymer composition will react with more formaldehyde at 50° C. than at 25° C. When the mixture of activated carbon and polyhydric polymer composition which has been exposed to air containing formaldehyde at room temperature is exposed to a temperature of 50° C., the activated carbon liberates some of the formaldehyde which it absorbed at 25° C., while the polyhydric polymer composition retains the formaldehyde with which it reacted at room temperature and reacts with the formaldehyde liberated from the activated carbon. Thus, the use of a mixture of polyhydric polymer composition and activated carbon prevents the release of formaldehyde into the air at elevated temperatures.

The amount of solid absorbent in admixture with a solid shaped polyhydric polymer composition may range from 0 to 95% by weight.

The polyhydric water-soluble polymer used in the method of this invention may be present in the solid shaped composition in the amount of 1.0–99.9% by weight, exclusive of the weight of the solid substrate, if any. The plasticizer may be present in the amount of 0–70% by weight and the catalyst may be present in the amount of 0–5% by weight. The water content of the solid shaped composition may be in the range of about 0.01 to 50% by weight and is dependent upon the ambient conditions.

EXAMPLES OF THE INVENTION

The following examples are illustrative embodiments of the practice of the present invention and are not to be construed as limitations on the invention or the claims. Numerous modifications will be obvious to those skilled in the art.

The extent of removal of formaldehyde from the atmosphere was determined by placing the solid shaped composition undergoing evaluation in a resin kettle which provided a chamber having an internal volume of 1200 cu. cm. The chamber was equipped with a removable top with ports for a thermometer, a 3-way stopcock and a dispersion tube for admission of air into the chamber near the bottom. The chamber was provided with a heating jacket for controlling the internal temperature. The test composition was placed in the chamber and the top was placed in position and clamped shut. The air pressure in the chamber was reduced by evacuation for 20 minutes using a water aspirator or a vacuum pump. The desired amount of paraformaldehyde (5–30 mg) was weighed into a small flask which was connected to the 3-way stopcock, and gaseous formaldehyde generated by heating the paraformaldehyde in the flask, was pulled into the chamber by the reduced pressure. The stopcock was then opened to the atmosphere until the chamber was at atmospheric pressure.

The test composition was exposed to the air containing formaldehyde in the test chamber for the desired period of 15 minutes to 3 days at 25° or 50° C. and the amount of formaldehyde removed from the air was determined by one of the following methods:

Method A:

The test chamber at room temperature was connected by tubing to a gas absorption bottle which was connected through a flow meter to a vacuum pump. The gas absorption bottle was filled with 400 ml distilled water. The pump was started to evacuate the chamber by pulling the air through the absorption bottle. The bubbling rate was controlled by clamps on the tubing to prevent too rapid evacuation and formaldehyde loss. When the bubbling in the bottle indicated that the chamber was almost empty, air was admitted into the chamber through the dispersion tube and, after closing the air inlet, evacuation was resumed. Calibration of the apparatus with known amounts of formaldehyde indicated that evacuation for 2 hours quantitatively removed the formaldehyde from the chamber. The formaldehyde content of the water in the absorption bottle was determined by the chromotropic acid-sulfuric acid procedure recommended by NIOSH (Method No. P&CAM 125).

Method B:

The test chamber was opened and the test composition was removed. The composition was placed in a 500 ml roundbottomed flask equipped with a vertical reflux condenser and an adapter for distillation through a Friedrich's column into a flask immersed in a dry ice-acetone mixture. After 10 ml phosphoric acid and 20 ml water were added to the contents of the flask, the mixture was heated under gentle reflux for 30 minutes. An additional 100 ml water was added through the reflux condenser, the latter was stoppered, and the heat input was increased so that the water and formaldehyde distilled out of the flask. The distillate was analyzed for formaldehyde content by the chromotropic acid-sulfuric acid procedure.

Method C:

The test chamber was opened and the test composition was removed. If a polyhydric polymer composition as well as a solid absorbent such as activated carbon was present, the components were separated manually. The formaldehyde content of the polyhydric polymer composition was determined in accordance with Method B. The activated carbon from the test composition was charged into a 12×0.25 inch glass tube which was wrapped with glass heating tape. The tube was connected through a flow meter to a nitrogen source at the inlet and a gas absorption bottle at the outlet. The tube was heated to 250°–270° C. while nitrogen was passed through the tube to carry the liberated formaldehyde into the water in the absorption bottle. Calibration of the apparatus indicated that the formaldehyde was quantitatively removed from the activated carbon in 3 hours. The formaldehyde content of the water in the absorption bottle was determined by the chromotropic acid-sulfuric acid procedure.

EXAMPLE 1

A mixture of 2.5 g glycerol, 0.01 g phosphoric acid and 20 ml water was heated with stirring to 60° C. A total of 5.0 g hydroxyethylcellulose (Hercules Inc. Natrosol 250 LR) was added slowly with stirring. The viscous solution was cooled and poured into an aluminum dish to form a 0.5 inch layer. The mixture was dried in an oven at 88° C. overnight and then allowed to stand at room temperature for 3 hours. The dried solid gel weighed 7.75 g, corresponding to a final composition of:

5.0 g hydroxyethylcellulose
2.5 g glycerol
0.01 g phosphoric acid
0.24 g water

The gel was cut into cubes and placed in a small aluminum dish in the test chamber. After 10 mg formaldehyde was charged into the chamber at 25° C., the gel was exposed for 15 minutes and then removed from the chamber. The amount of formaldehyde removed from the air, according to analysis of the gel by Method B, was 7.96 mg (79.6%), as compared with 0 mg for gel subjected to the same procedure without exposure to formaldehyde.

EXAMPLE 2

A solution of 5.0 g hydroxyethylcellulose, 2.5 g glycerol, 0.01 g phosphoric acid and 57.0 ml water was prepared in the same manner as described in Example 1. The solution was poured into a beaker which contained 2.5 g 0.25–0.50 inch pieces of cut polystyrene foam and just covered the solid pieces. The mixture was spread on a piece of aluminum foil and dried in an oven at 80° C. overnight. The total weight of the pieces of polystyrene foam coated with the hydroxyethylcellulose-glycerol-phosphoric acid-water composition was 10.25 g, corresponding to a final composition of:

5.0 g hydroxyethylcellulose
  2.5 g glycerol
  0.01 g phosphoric acid
  2.5 g polystyrene foam
  0.24 g water The coated pieces of polystyrene foam were placed in the test chamber which was charged with 10 mg formaldehyde. After 15 minutes of exposure at 25° C., the coated foam pieces were removed from the chamber and analyzed for formaldehyde content in accordance with Method B. The amount of formaldehyde removed from the air was 8.4 mg (84%) as compared with 0 mg for uncoated foam.

EXAMPLE 3

A. A solution of 5.0 g hydroxyethylcellulose, 0.01 g phosphoric acid and 60 ml water was mixed with 2.5 g polystyrene foam pieces, spread on aluminum foil and dried at 80° C. overnight, as described in Example 2. The coated polystyrene foam pieces were placed in the test chamber which was then charged with 10 mg formaldehyde. After 15 minutes at 25° C., the coated foam pieces were removed and the formaldehyde content was analyzed in accordance with Method B. The amount of formaldehyde removed from the air was 8.8 mg (88%).

B. A solution of 5.0 g hydroxyethylcellulose in 60 ml water was used to coat 2.5 g polystyrene foam pieces. After exposure to 10 mg formaldehyde for 15 minutes in the test chamber at 25° C., the coated polystyrene foam pieces removed 5.4 mg (54%) of the formaldehyde from the air.

EXAMPLES 4–9

Solutions of water-soluble polyhydric polymers were prepared and coated on various substrates, as described in Example 2. The coated solids were exposed to 10 mg formaldehyde for 15 minutes in the test chamber at 25° C. and analyzed for formaldehyde content by Method B. The results are set forth in Table 1.

TABLE 1

| Example | 4 | 5 | 6 | 7 | 8 | 9 |
|---|---|---|---|---|---|---|
| Polymer type[a] | HPMC | CS | GG | CMC | CMHEC | CMHEC |
| g | 5.0 | 5.0 | 5.0 | 5.0 | 5.0 | 5.0 |
| Glycerol, g | 2.5 | 2.5 | 2.5 | 2.5 | 2.5 | 2.5 |
| H3PO4, g | 0.01 | 0.01 | 0.01 | 0.01 | 0.01 | 0.01 |
| Water, ml | 80 | 20 | 250 | 80 | 70 | 70 |
| Substrate type[b] | V | V | V | CL | S | PSF |
| g | 12.0 | 7.5 | 45.0 | 5.5 | 150.0 | 2.0 |
| Coated solid, g | 20.5 | 17.5 | 55.0 | 13.8 | — | 9.0 |
| Formaldehyde removal from air, % | 53 | 80 | 46 | 40 | 75 | 80 |

[a] CMC = carboxymethylcellulose (CMC cellulose gum)
CMHEC = carboxymethylhydroxyethylcellulose (CMHEC 37M)
CS = oxidized starch with 0.3% carboxyl content (Nalex 50)
GG = guar gum (Jaguar J2S)
HPMC = hydroxypropylmethylcellulose (Methocel E 50)
[b] CL = cotten linters
S = sand
PSF = polystyrene foam
V = vermiculite

EXAMPLE 10

A solution of 20 g hydroxyethylcellulose and 0.01 g H3PO4 in 80 ml water was used to coat a Whatman No. 1 filter paper circle. The solution was drawn down on one side of the paper and dried overnight at 80° C.

The original weight of the 155 sq. cm. circle of paper was 1.340 g and the weight of the coating of 0.333 g represented 20% of the total weight and a unit weight of 2.15 mg/sq. cm.

The coated paper was placed in the test chamber which was charged with 5 mg formaldehyde. After 66 hours at 25° C. the chamber was evacuated and the formaldehyde content of the air was determined in accordance with Method A. The chamber was recharged with 5 mg formaldehyde and evacuated after 18 hours. A third charge of 5 mg formaldehyde was evacuated after 18 hours. A fourth charge of 10 mg formaldehyde was evacuated after 42 hours and a fifth charge of 10 mg formaldehyde was evacuated after 66 hours. The results are set forth in Table 2.

TABLE 2

| Cycle | 1 | 2 | 3 | 4 | 5 |
|---|---|---|---|---|---|
| Time, hours | 66 | 18 | 18 | 42 | 66 |
| Formaldehyde Charged, mg | 5.00 | 5.00 | 5.00 | 10.00 | 10.00 |
| Removed, mg | 4.91 | 4.73 | 4.20 | 8.20 | 6.96 |
| % | 98.2 | 94.6 | 84.0 | 82.0 | 69.6 |
| Cumulative Results |  |  |  |  |  |
| Exposure time, hours |  | 84 | 102 | 144 | 210 |
| Formaldehyde Charged, mg |  | 10.00 | 15.00 | 25.00 | 35.00 |
| Removed, mg |  | 9.64 | 13.84 | 22.04 | 29.00 |
| % |  | 96.4 | 92.3 | 88.16 | 82.9 |

EXAMPLE 11

The hydroxyethylcellulose solution of Example 10 was used to coat a 1.325 g filter paper circle with a 1.808 g coating, representing 58% of the total weight and a unit weight of 11.66 mg/sq. cm.

The coated paper was placed in the test chamber and exposed to 5 mg formaldehyde. After 66 hours at 25° C. the chamber was evacuated and the formaldehdye content of the air was determined by Method A. The chamber was recharged with 5 mg formaldehyde and evacuated after 18 hours. The process was repeated with 10 mg formaldehyde per charge for a total of 10 cycles over 21 days. A total of 85 mg formaldehyde was charged and 61 mg were removed from the air during this period.

EXAMPLE 12

A piece of Whatman No. filter paper was coated with a solution of 16 g poly(vinyl alcohol) (Air Products & Chemicals Inc. Vinol 205), 4.0 g glycerol and 0.10 g phosphoric acid in 80 ml water. The 155 sq. cm. circle weighing 1.334 g was coated with 1.019 g poly(vinyl alcohol)-glycerol composition, representing 43% of the total weight and a unit weight of 6.57 mg/sq. cm.

The coated paper was exposed to 4 cycles of 5 mg formaldehyde over a period of 6 days. The results are set forth in Table 3.

TABLE 3

| Cycle | 1 | 2 | 3 | 4 |
|---|---|---|---|---|
| Time, hours | 18 | 18 | 18 | 66 |
| Formaldehyde |  |  |  |  |
| Charged, mg | 5.00 | 5.00 | 5.00 | 5.00 |
| Removed, mg | 4.86 | 4.80 | 4.82 | 4.89 |
| % | 97.2 | 96.0 | 96.4 | 97.8 |
| Cumulative Results |  |  |  |  |
| Exposure time, hours |  | 36 | 54 | 120 |
| Formaldehyde |  |  |  |  |
| Charged, mg |  | 10.00 | 15.00 | 20.00 |
| Removed, mg |  | 9.66 | 14.48 | 19.37 |
| % |  | 96.6 | 96.5 | 96.9 |

EXAMPLE 13

A. A 5 g charge of activated carbon pellets (North American Carbon Inc., Type G352, 85% minimum 4-6 mesh, 0.37-0.42 g/cc packed density) was exposed to 10 mg formaldehyde in the test chamber at 25° C. for 15 minutes. The activated carbon was then removed from the chamber and analyzed for formaldehyde content in accordance with Method C.

B. A 5 g charge of activated carbon pellets was exposed to 10 mg formaldehyde at 50° C. for 2 hours, removed from the test chamber and analyzed for formaldehyde content in accordance with Method C.

C. A 5 g charge of hydroxyethylcellulose-glycerol-$H_3PO_4$ cubes from Example 1 was exposed to 10 mg formaldehyde at 25° C. for 15 minutes, removed from the test chamber and analyzed for formaldehyde content in accordance with Method B.

D. A 5 g charge of hydroxyethylcellulose-glycerol-$H_3PO_4$ cubes from Example 1 was exposed to 10 mg formaldehyde at 50° C. for 2 hours, removed from the test chamber and analyzed for formaldehyde content in accordance with Method B.

E. A 10 g charge consisting of 5 g activated carbon pellets and 5 g hydroxyethylcellulose-glycerol-$H_3PO_4$ cubes from Example 1 was exposed to 10 mg formaldehyde at 25° C. for 15 minutes and then removed from the test chamber. The activated carbon pellets and the hydroxyethylcellulose cubes were separated manually and the former was analyzed for formaldehyde content by Method C and the latter was analyzed by Method B.

F. A 10 g charge consisting of 5 g activated carbon pellets and 5 g hydroxyethylcellulose-glycerol-$H_3PO_4$ cubes from Example 1 was exposed to 10 mg formaldehyde at 25° C. for 15 minutes and then removed from the test chamber. The empty chamber was heated in an oven at 110° C. for 30 minutes to remove any formaldehyde or paraformaldehyde which may have formed on the chamber walls. The chamber was cooled and then brought to 50° C. with the heating jacket. The mixture of activated carbon pellets and hydroxyethylcellulose cubes removed earlier from the chamber was returned to the chamber which was then closed and maintained at 50° C. for 2 hours. The mixture was then removed from the chamber and the activated carbon pellets and the hydroxyethylcellulose cubes were separated manually and analyzed for formaldehyde content by Methods C and B, respectively.

The amounts of formaldehyde removed from the air by the various exposures are set forth in Table 4.

The activated carbon pellets absorb more formaldehyde after 15 minutes at 25° C. than after 2 hours at 50° C. In contrast, the hydroxyethylcellulose composition (HEC) absorbs less formaldehyde after 15 minutes at 25° C. than after 2 hours at 50° C. The activated carbon in admixture with the HEC absorbs more formaldehyde than the latter at 25° C. However, when returned to an atmosphere free of formaldehyde at 50° C., the activated carbon liberates absorbed formaldehyde which is then removed from the atmosphere by the HEC composition. The mixture is advantageous in preventing the release of formaldehyde into the atmosphere when the temperature rises.

TABLE 4

| Example | 13A | 13B | 13C | 13D | 13E | 13F |
|---|---|---|---|---|---|---|
| Charge |  |  |  |  |  |  |
| Activated carbon | 5 | 5 | — | — | 5 | 5 |
| HEC-glycerol cubes[a] | — | — | 5 | 5 | 5 | 5 |
| Formaldehyde, mg | 10 | 10 | 10 | 10 | 10 | 10 0 |
| Temperature, °C. | 25 | 50 | 25 | 50 | 25 | 25 50 |
| Time, minutes | 15 | 120 | 15 | 120 | 15 | 15 120 |
| Formaldehyde removed by |  |  |  |  |  |  |
| Activated carbon, % | 50.4 | 44.4 | — | — | 54 | — 32 |
| HEC-glycerol, % | — | — | 47.2 | 66.4 | 34 | — 50 |

[a] A 5 g charge contains 3.23 g HEC, 1.61 g glycerol, 0.006 g $H_3PO_4$ and 0.155 g water

EXAMPLE 14

An aqueous solution of hydroxyethylcellulose, glycerol and phosphoric acid (6.66/3.33/0.01 weight ratio) was brushed on a screen having 0.25 inch openings. After air drying, the screen was mounted in the return duct of a home air conditioning/heating system. The screen was effective in removing formaldehyde from the air for an extended period. The screen was then washed under running water to remove the old coating and then brushed again with a solution of polyhydric polymer composition to apply a new coating.

EXAMPLE 15

An aqueous solution of poly(vinyl alcohol) and diethylene glycol (80/20 weight ratio) was acidified with acetic acid and 10% glyoxal was added. The solution was coated on paper and dried in an oven at 100° C.

After a number of 1 inch diameter holes were cut out of the coated paper, it was used as the backing on a fiber glass fiber for an air recirculating system.

EXAMPLE 16

A. A solution of 3.35 g hydroxyethylcellulose, 1.65 g glycerol and 0.01 g phosphoric acid in 45 ml water was mixed with 11 g perlite and dried in a tumbler at 80° C. The coated perlite was placed in the test chamber which was charged with 10 mg formaldehyde. After 15 minutes at 25° C., the coated perlite was removed from the chamber and analyzed for formaldehyde content in accordance with Method B. The amount of formaldehyde removed from the air was 7.04 mg (70.4%).

B. An 11 g charge of uncoated perlite was placed in the test chamber with 10 mg formaldehyde for 15 minutes at 25° C. The perlite was removed from the chamber and analyzed by Method B. The perlite removed 2.52 mg (25.2%) of the formaldehyde from the air.

I claim:

1. A method for purifying air by removal of gaseous formaldehyde which consists in permitting the air to come in contact with a solid shaped composition consisting essentially of one or more polyhydric water-soluble polymers and ambient moisture.

2. The method according to claim 1 wherein said polyhydric water-soluble polymer is selected from the group consisting of polysaccharides, modified polysaccharides and hydroxyl-containing addition and condensation polymers.

3. The method according to claim 2 wherein said polysaccharide is selected from the group consisting of plant polysaccharides, and polysaccharides and microbial polysaccharides.

4. The method according to claim 1 wherein said modified polysaccharide is selected from the group consisting of cellulose ethers, starch ethers, cellulose esters, starch esters, cellulose graft copolymers and starch graft copolymers.

5. The method according to claim 4 wherein said cellulose ether is selected from the group consisting of alkylcelluloses, hydroxyalkylcelluloses and carboxyalkylcelluloses.

6. The method according to claim 5 wherein said hydroxyalkylcellulose is selected from the group consisting of hydroxyethylcellulose, hydroxypropylcellulose, hydroxypropylmethylcellulose and carboxymethylhydroxyethylcellulose.

7. The method according to claim 5 wherein said alkylcellulose is methylcellulose.

8. The method according to claim 3 wherein said plant polysaccharide is starch.

9. The method according to claim 5 wherein said carboxyalkylcellulose is carboxymethylcellulose.

10. The method according to claim 2 wherein said hydroxyl-containing addition polymer is selected from the group consisting of poly(vinyl alcohol), partially hydrolyzed poly(vinyl acetate), poly(hydroxyalkyl acrylates), poly(hydroxyalkyl methacrylates) and hydroxyalkylated poly(vinyl alcohol).

11. The method according to claim 4 wherein said cellulose and starch graft copolymers are acrylic acid graft copolymers.

12. The method according to claim 1 wherein said solid shaped composition contains 0–70% by weight of a plasticizer.

13. The method according to claim 12 wherein said plasticizer is a low molecular weight polyol selected from the group consisting of glycerol, glycols, polyalkylene glycols and alkanolamines.

14. The method according to claim 1 wherein said solid shaped composition contains 0–5% by weight of a catalyst.

15. The method according to claim 1 wherein said solid shaped composition is partially crosslinked.

16. The method for purifying air by removal of gaseous formaldehyde which consists in permitting the air to come in contact with a solid substrate which contains a coating consisting essentially of one or more polyhydric water-soluble polymers and ambient moisture.

17. The method according to claim 16 wherein said solid substrate is selected from the group consisting of particulate solids, foams, fibrous solids and woven and nonwoven fibrous webs.

18. The method according to claim 16 wherein said polyhydric water-soluble polymer is selected from the group consisting of polysaccharides, modified polysaccharides and hydroxyl-containing addition and condensation polymers.

19. The method according to claim 16 wherein said coating is partially crosslinked.

20. The method according to claim 1 wherein the air is permitted to come in contact with a solid shaped composition in an air recirculating system.

21. The method according to claim 20 wherein said solid shaped composition is partially crosslinked.

22. A method for purifying air by removal of gaseous formaldehyde which consists in permitting the air to come in contact with a mixture of a solid absorbent and a solid shaped composition consisting essentially of one or more polyhydric water-soluble polymers and ambient moisture.

23. The method according to claim 22 wherein the solid absorbent is activated carbon.

24. The method according to claim 22 wherein the polyhydric water-soluble polymer is selected from the group consisting of polysaccharides, modified polysaccharides and hydroxyl-containing addition and condensation polymers.

25. The method according to claim 22 wherein said solid shaped composition is partially crosslinked.

26. The method according to claim 22 wherein said solid shaped composition consists of a solid substrate coated with one or more polyhydric water-soluble polymers and ambient moisture.

* * * * *